United States Patent [19]

Dransfield et al.

[11] Patent Number: 5,206,192

[45] Date of Patent: Apr. 27, 1993

[54] STABILIZED METAL OXIDES

[75] Inventors: Graham P. Dransfield; Paul McColgan, both of Stockton on Tees, England

[73] Assignee: Tioxide Group Services Limited, London, England

[21] Appl. No.: 794,920

[22] Filed: Nov. 20, 1991

[30] Foreign Application Priority Data

Dec. 12, 1990 [GB] United Kingdom ............. 9026952

[51] Int. Cl.$^5$ ............................................. C04B 35/48
[52] U.S. Cl. ................................................. 501/103
[58] Field of Search ...................................... 501/103

[56] References Cited

U.S. PATENT DOCUMENTS

| | | | |
|---|---|---|---|
| 3,957,500 | 5/1976 | Pitts | 106/57 |
| 4,820,593 | 4/1989 | Egerton et al. | 428/698 |
| 4,851,293 | 7/1989 | Egerton et al. | 501/103 |
| 4,977,114 | 12/1990 | Horinouchi et al. | 501/103 |
| 4,985,379 | 1/1991 | Egerton et al. | 501/103 |
| 5,017,532 | 5/1991 | Sonnenberg et al. | 501/103 |
| 5,030,601 | 7/1991 | Michel et al. | 501/103 |
| 5,081,081 | 1/1992 | Fothergill | 501/103 |

FOREIGN PATENT DOCUMENTS

| | | |
|---|---|---|
| 262579 | 4/1988 | European Pat. Off. |
| 354573 | 2/1990 | European Pat. Off. |
| 401999 | 12/1990 | European Pat. Off. |
| 2590887 | 5/1987 | France |
| 01201075 | 8/1989 | Japan |
| 02/137728 | 5/1990 | Japan |
| 02/175602 | 7/1990 | Japan |
| 2206111 | 12/1988 | United Kingdom |

Primary Examiner—Mark L. Bell
Assistant Examiner—Deborah Jones
Attorney, Agent, or Firm—Baker & Botts

[57] ABSTRACT

The invention provides a form of particulate zirconia suitable for forming zirconia ceramics in which the zirconia is stabilized in the cubic and/or tetragonal phase.

The particles of zirconia are coated with a hydrous oxide of cerium and at least one hydrous oxide of lanthanum, neodymium or praseodymium. In a preferred embodiment a mixture of hydrous oxides of lanthanum and neodymium is used.

Preferably the particles are also provided with an inner coating comprising hydrous titania, zirconia or alumina.

The products of the invention can be converted into ceramics having a greater strength than ceramics produced from zirconia coated with a similar amount of ceria alone or those produced by physically mixing similar quantities of stabilizing oxides with the particulate zirconia.

13 Claims, No Drawings

STABILIZED METAL OXIDES

This invention relates to stabilised metallic oxides and particularly to those stabilised by coating with a hydrous cerium oxide.

Zirconium oxide is used in the manufacture of ceramic materials and during such manufacture the oxide is heated during which the crystal form of the oxide changes from the normal room temperature monoclinic habit to tetragonal and cubic forms depending on the temperature to which the oxide is heated. Under normal conditions only the monoclinic form of pure zirconia is stable at room temperature and unless steps are taken to stabilise the tetragonal or cubic forms these revert to the monoclinic form on cooling.

The presence of at least some of these high temperature tetragonal and cubic crystal habits is desirable in ceramics and steps have been taken in the past to improve the stability of these crystalline forms at room temperature. Such steps have included mixing the zirconia with a stabilising agent which becomes incorporated in the zirconia on heating the doped oxide and exerts a stabilising influence on the crystal formed when it is cooled to room temperature.

One stabilising agent which has been used is cerium oxide and stabilised or partially stabilised compositions have been formed from zirconia by mixing the bulk zirconia powder with a cerium oxide powder and subjecting the mix to calcination and grinding to form the appropriately sized stabilised ceramic material. Alternatively a mixture of zirconia and cerium oxide has been formed by coprecipitating hydrous zirconia and hydrous ceria from aqueous solution to form intimate co-mixed hydrous oxides which are then calcined prior to grinding to obtain the mixed oxide ceramic composition. These methods of manufacture of stabilised compositions are very energy intensive in requiring calcination and grinding and in addition can lead to excessive crystal growth and/or reduced purity of the resultant powder.

An alternative method of producing a zirconia powder which can be transformed to a stabilised zirconia by firing is to coat particles of zirconia with a stabilising oxide such as cerium oxide. It has been found that relatively large quantities of expensive cerium oxide are needed to produce zirconia which can be fired to form a ceramic body with high strength.

It is an object of the current invention to provide a stabilised zirconia in which these disadvantages are substantially reduced.

According to the present invention a composition suitable for use in the manufacture of a ceramic material comprises particulate zirconia in which the particles are coated with a hydrous oxide of cerium and with at least one hydrous oxide of lanthanum, neodymium or praseodymium.

The coated zirconia of the present invention transforms to stabilised zirconia upon firing to form the ceramic body and the use of a hydrous oxide of lanthanum, neodymium or praseodymium permits the formation of a ceramic body with a strength higher than that produced when the zirconia is stabilised by coating particles with a similar amount of hydrous oxide of cerium alone.

According to the invention also a method of preparing a composition suitable for use in the manufacture of a ceramic material comprises coating particles of zirconia with a hydrous oxide of cerium and with at least one hydrous oxide of lanthanum, neodymium or praseodymium.

The cerium oxide may be present as one layer with the oxide of lanthanum, neodymium or praseodymium forming one or more distinct layers or there may be present only one layer comprising a mixture of cerium oxide with one or more of the aforementioned oxides.

Other inorganic oxides may also be present as a coating on the surface of the zirconia particles and in a preferred embodiment the zirconia particles are coated with an inner coating of hydrous titania, zirconia or alumina or a mixture of these surrounded by an outer coating or coatings of cerium oxide and at least one oxide of lanthanum, neodymium or praseodymium.

It is preferable that the hydrous oxide of cerium present in the products of the invention is in the form of a hydrous Ce (IV) oxide.

Particularly useful products comprise particulate zirconia having a size such that the majority of the particles have a diameter of less than or equal to 0.5 micron and preferably less than 0.2 micron.

The amount of hydrous oxide of cerium and the amount of the hydrous oxide of lanthanum, neodymium or praseodymium employed depend upon the combination of hydrous oxides used and upon the degree of stability that it is desired should be imparted to the fired zirconia. It will be clear from reading this specification that partial stabilisation of the zirconia is desirable in certain circumstances as is full stabilisation i.e. stabilising the product to the highest extent possible. Generally speaking for a partially stabilised product the amount of the hydrous cerium oxide present as coating will be less than that required for a fully stabilised product. A particularly desirable degree of stabilisation corresponds to a body in which the predominant phase of zirconia is tetragonal. Such a product has been termed tetragonal zirconia polycrystals (TZP). The amount of hydrous cerium oxide present as a coating will also depend to some extent on the quantity of lanthanum, neodymium or praseodymium oxide present. Generally speaking, the degree of stabilisation is increased by increasing the amount of the hydrous oxide of lanthanum, neodymium or praseodymium without changing the amount of hydrous cerium oxide present. Alternatively, the amount of hydrous cerium oxide needed to produce a given degree of stabilisation can be reduced by increasing the amount of hydrous oxide of lanthanum, neodymium or praseodymium present.

For a partially stabilised zirconia it has been found useful to provide in the coating an amount of hydrous cerium oxide of from about 2 to about 20 weight % expressed as $CeO_2$ based on weight of zirconia and from about 0.05 to about 5.0 weight % hydrous oxide of lanthanum, neodymium or praseodymium expressed as $La_2O_3$, $Nd_2O_3$ or $Pr_2O_3$ based on weight of zirconia.

Mixtures of hydrous oxides of lanthanum, neodymium and praseodymium oxide can be used and a particularly preferred mixture contains hydrous oxides of lanthanum and neodymium. Using this preferred mixture, a partially stabilised zirconia is produced with from about 2 to about 12 weight % hydrous cerium oxide expressed as $CeO_2$ and from about 0.05 to about 5.0 weight % of mixed hydrous oxides expressed as $La_2O_3 + Nd_2O_3$. Preferably the partially stabilised zirconia is produced with from about 4 to about 10 weight % hydrous cerium oxide expressed as $CeO_2$ and from about 0.1 to about 3.0 weight % of mixed hydrous oxides expressed as $La_2O_3 + Nd_2O_3$.

In accordance with the invention the particulate zirconium oxide used to form the basis of the material to be used as a ceramic is preferably formed by the vapour phase oxidation/hydrolysis of a vaporised zirconium compound. Typical zirconium compounds which can be oxidised or hydrolysed in the vapour state are the zirconium halides, particularly zirconium tetrachloride and zirconium alkoxides. This is usually carried out by mixing the zirconium compound with an excess of heated oxygen or water vapour under such conditions that oxidation or hydrolysis of the zirconium tetrachloride takes place and the desired sized zirconia is obtained directly on cooling and separating from the gas stream. A preferred method of heating oxygen to react with the zirconium tetrachloride is to pass the oxygen through an electric arc between two electrodes supplied with electrical power at an appropriate voltage and amperage which commonly generates a so-called electrical plasma. This form of manufacture of the particulate zirconia has an advantage in that the product is obtained in the oxide form directly and that the oxidation process can be controlled so that the particle size of the product is as near to the crystal size as it is possible to obtain without extensive grinding of the product being required before treatment with the coating agents.

The product of the invention is obtained by treating the particulate zirconia in such a manner that the various hydrous oxides are deposited as coatings on the surface of the particles of zirconia. Preferably the coating operation is carried out as a wet treatment process in which, initially, the zirconia particles are dispersed in water. It has been found that this dispersion can be effected directly by mixing the particles of zirconia with water without there being any requirement for a dispersing agent. This is advisable because it avoids any unnecessary contamination of the product with constituents of the dispersing agent. Generally speaking zirconia obtained from the vapour phase oxidation of the zirconium halide is highly acidic when mixed with water and depending on the exact form of the particles zirconia can produce a dispersion pH of the order of 1 clearly indicating the highly acidic dispersions.

As described the dispersion of the zirconia particles in water is effected normally by stirring with water and in an amount such that the obtained dispersion contains zirconia in a concentration of up to 400 gpl. Usually the amount of zirconia is not less than 50 gpl zirconia and a convenient concentration to employ in practice is 200 gpl of zirconia. It is, however, possible to improve the degree of dispersion by milling in, for example, a sand mill if desired.

To the aqueous dispersion of the particulate zirconia there is added a water soluble hydrolysable compound of cerium in an amount sufficient to introduce on hydrolysis the required amount of hydrous oxide as a coating. Examples of water soluble hydrolysable compounds of cerium which can be used include cerium sulphate, cerium chloride, cerium nitrate and cerium acetate. When it is desired to form a mixed coating of hydrous cerium oxide together with a hydrous oxide of lanthanum, neodymium or praseodymium then a water soluble hydrolysable compound of lanthanum, neodymium of praseodymium is also added to the zirconia slurry. Water soluble hydrolysable compounds which can be used include chlorides, sulphates and nitrates of lanthanum, neodymium and praseodymium.

Any suitable means of mixing the aqueous dispersion of zirconia with the hydrolysable metal compounds can be used and a range of temperatures may be employed although it is preferred that the coating process be carried out at a temperature of from 10° C. to 70° C.

After mixing of the hydrolysable metal compounds with the aqueous dispersion of zirconia, the pH of the dispersion is raised to precipitate the coating of hydrous oxides of cerium and lanthanum, neodymium or praseodymium. The pH to which the dispersion is raised is from 2 to 9 and preferably from 7 to 9.

The neutralisation and increase in pH of the acidic aqueous dispersion preferably is carried out by the addition of an appropriate alkali to the aqueous dispersion. It is most convenient if the alkali is ammonium hydroxide since this does not introduce any objectionable metallic ions into the solution and waste ammonia can be driven off by heating. Stronger alkali such as an alkaline metal hydroxide can be used such as sodium hydroxide or potassium hydroxide. However when such alkaline metal hydroxides are used it is necessary to wash the product adequately to remove any contaminating alkali metal ions. Normally the product obtained should not contain an alkali metal impurity level greater than 0.01% expressed as $M_2O$.

After deposition of the hydrous oxide coating the product is separated by filtering, washing as necessary and drying. If required the dried product may be ground or milled to remove any aggregation that has occurred during processing.

In an alternative process the pH of a mixture of a water soluble hydrolysable compound of cerium with an aqueous slurry of zirconia is adjusted with an alkali to deposit a coating of hydrous cerium oxide on the zirconia particles and these coated particles are subsequently coated with a layer of hydrous oxide of lanthanum, neodymium or praseodymium by precipitation of the hydrous oxide from an aqueous solution of a hydrolysable metal compound substantially as described hereinbefore.

In a particularly preferred embodiment there is also provided on the zirconia particles an inner coating of a hydrous oxide of titanium, zirconium or aluminium. This coating is provided in substantially similar manner to that employed for producing coatings of the other hydrous metal oxides by hydrolysis of water soluble compounds such as titanyl sulphate, titanyl aluminium sulphate, zirconium chloride, zirconium sulphate, aluminium sulphate or aluminium nitrate. The coating with a hydrous oxide of titanium, zirconium or aluminium may be effected before addition of the hydrolysable compounds of cerium and lanthanum, neodymium or praseodymium but the coating process preferably involves mixing the zirconia slurry firstly with a hydrolysable compound of titanium, zirconium or aluminium and secondly with a hydrolysable compound of cerium and a hydrolysable compound of lanthanum, neodymium or praseodymium.

The powdered product is eminently suitable for use in the manufacture of shaped ceramic bodies by firing.

The product in having the hydrous cerium oxide stabilising agent and the hydrous oxide of lanthanum, neodymium or praseodymium present as a coating provides a well distributed and intimate mixture of these oxides and on firing good incorporation of the oxides through the zirconia is achieved.

The use of hydrous oxides of lanthanum, neodymium or praseodymium together with the hydrous cerium oxide enables the production of stronger ceramics than those produced with a similar amount of hydrous cerium oxide alone and the products of this invention generally produce ceramic bodies with a higher strength than those containing similar quantities of the same oxides but produced from known starting materials.

The invention is illustrated by the following Examples.

EXAMPLE 1

Zirconia particles of approximately 0.1 microns diameter prepared by vapour phase oxidation of zirconium tetrachloride were dispersed in water at a concentration of 150 grams per liter. As a result of the reaction of residual Zr-Cl groups with water the dispersion obtained had a pH value of 1.7.

An aqueous solution of acid zirconium sulphate (containing the equivalent of 100 grams per liter $ZrO_2$) was added to the dispersion in an amount sufficient to introduce hydrous zirconia in an amount of 1% by weight as $ZrO_2$ on solids. To the dispersion obtained there was then added an aqueous solution of cerium sulphate (containing the equivalent of 40 grams per liter $CeO_2$) in an amount sufficient to introduce 2% by weight $CeO_2$ on solids. At the same time there was added an aqueous solution of neodymium chloride (containing the equivalent of 40 grams per liter $Nd_2O_3$) in an amount sufficient to introduce 2% by weight $Nd_2O_3$ on solids. The pH was raised with ammonium hydroxide (10% w/w) to a value of 8.5 over a period of 45 minutes and the dispersion was then stirred for a further 30 minutes. The solution filtered quickly and the filter cake was washed, dried and milled for 16 hours in a ball mill in isopropyl alcohol at a concentration of 300 grams per litre using zirconia grinding media, having a size of 1 cm×1 cm. The grinding media were removed by sieving and the alcohol evaporated on a water bath. Analysis of the product showed the presence of the equivalent of 7.9% by weight $CeO_2$ and 1.8% by weight $Nd_2O_3$ in the form of hydrous oxide as coating on the particles.

The quality of the ceria+neodymia/zirconia coated powder was assessed by single ended die-pressing the powder, at 30 MPa into 20 disks of approximately 30 mm diameter. The disks were fired at 1450° C. The strength (modulus of rupture) of 10 polished disks was measured by a three point biaxial test, from which a mean value of 1250 MPa was derived. The density of the disks was measured by mercury densometry and a mean value of 6.08 g/cm$^3$ was obtained.

EXAMPLE 2

Zirconium oxide particles of approximately 0.1 microns diameter prepared by vapour phase oxidation of zirconium tetrachloride were dispersed in water at a concentration of 150 grams per liter. As a result of the reaction of residual Zr-Cl groups with water the dispersion obtained had a pH value of 1.7.

An aqueous solution of acid zirconium sulphate (containing the equivalent of 100 grams per liter $ZrO_2$) was added to the dispersion in an amount sufficient to introduce hydrous zirconia in an amount of 1% by weight as $ZrO_2$ on solids. To the dispersion obtained there was then added an aqueous solution of cerium sulphate (containing the equivalent of 40 grams per liter $CeO_2$) in an amount sufficient to introduce 8% by weight $CeO_2$ on solids and an aqueous solution of neodymium chloride (containing the equivalent of 40 grams per liter $Nd_2O_3$) in an amount sufficient to introduce 2% by weight $Nd_2O_3$ on solids and an aqueous solution of lanthanum chloride (containing the equivalent of 40 grams per liter $La_2O_3$) in an amount sufficient to introduce 1% by weight $La_2O_3$ on solids. The pH was raised with ammonium hydroxide (10% w/w) to a value of 8.5 over a period of 45 minutes and the dispersion was then stirred for a further 30 minutes. The solution filtered quickly and the filter cake was washed, dried and milled for 16 hours in a ball mill in isopropyl alcohol at a concentration of 300 grams per litre using zirconia grinding media, having a size of 1 cm×1 cm. The grinding media were removed by sieving and the alcohol evaporated on a water bath. Analysis of the product showed the presence of the equivalent of 7.9% by weight $CeO_2$ and 1.8% by weight $Nd_2O_3$ and 0.8% by weight $La_2O_3$ in the form of hydrous oxide as coating on the particles.

The quality of the ceria+neodymia+lanthana/zirconia coated powder was assessed by single ended die-pressing the powder, at 30 MPa into 20 disks of approximately 30 mm diameter. The disks were fired at 1450° C. The strength (modulus of rupture) of 10 polished disks was measured by a three point biaxial test, from which a mean value of 1617 MPa was derived. The density of the disks was measured by mercury densometry and a mean value of 6.07 g/cm$^3$ was obtained.

EXAMPLE 3

A sample of zirconium oxide was coated in a manner similar to that described in Example 1 except that to the zirconia dispersion was added an aqueous solution of cerium sulphate (containing the equivalent of 40 grams per liter $CeO_2$) in an amount sufficient to introduce 2% by weight $CeO_2$ on solids and an aqueous solution of neodymium chloride (containing the equivalent of 40 grams per liter $Nd_2O_3$) in an amount sufficient to introduce 2% by weight $Nd_2O_3$ on solids. Analysis of the product showed the presence of the equivalent of 2.1% by weight $CeO_2$ and 1.8% by weight $Nd_2O_3$. The product was tested as described in Example 1 and the polished disks had a strength (modulus of rupture) of 300 MPa. The density of the disks was measured by mercury densometry and a mean value of 5.6 g/cm$^3$ was obtained.

EXAMPLE 4

A sample of the zirconium oxide was coated in a manner similar to that described in Example 1 except that to the zirconia dispersion was added an aqueous solution of cerium sulphate (containing the equivalent of 40 grams per liter $CeO_2$) in an amount sufficient to introduce 12.25% by weight $CeO_2$ on solids and an aqueous solution of lanthanum chloride (containing the equivalent of 40 grams per liter $La_2O_3$) in an amount sufficient to introduce 2% by weight $La_2O_3$ on solids. Analysis of the product showed the presence of the equivalent of 12% by weight $CeO_2$ and 1.7% by weight $La_2O_3$. The product was tested as described in Example 1 and the polished disks had a strength (modulus of rupture) of 1350 MPa. The density of the disks was measured by mercury densometry and a mean value of 5.99 g/cm$^3$ was obtained.

EXAMPLE 5

A sample of the zirconium oxide dispersion was prepared in a manner similar to that described in Example 1. To this dispersion was added an aqueous solution of commercial grade cerium sulphate (containing the equivalent of 40 grams per liter $CeO_2$) in an amount sufficient to introduce 10% by weight $CeO_2$ on solids. Analysis of the product showed the presence of the equivalent of 9.7% by weight $CeO_2$ and 1.8% by weight $Nd_2O_3$. The product was tested as described in Example 1 and the polished disks had a strength (modulus of rupture) of 1250 MPa. The density of the disks was measured by mercury densometry and a mean value of 6.05 g/cm$^3$ was obtained.

EXAMPLE 6

A sample of the zirconium oxide dispersion was prepared in a manner similar to that described in Example 1. To this dispersion was added an aqueous solution of cerium sulphate (containing the equivalent of 40 grams per liter $CeO_2$) in an amount sufficient to introduce 10% by weight $CeO_2$ on solids and an aqueous solution of praseodymium nitrate (containing the equivalent of 40 grams per liter $Pr_2O_3$) in an amount sufficient to introduce 2% by weight $Pr_2O_3$ on solids. Analysis of the product showed the presence of the equivalent of 7.99% by weight $CeO_2$ and 2.4% by weight $Pr_2O_3$. The product was tested as described in Example 1 and the polished disks had a strength (modulus of rupture) of 816 MPa. The density of the disks was measured by mercury densometry and a mean value of 5.94 g/cm$^3$ was obtained.

EXAMPLE 7

A sample of zirconium oxide dispersion was prepared in a manner similar to that described in Example 1. To this dispersion was added an aqueous solution of commercial grade cerium sulphate (containing the equivalent of 40 grams per liter $CeO_2$) in an amount sufficient to introduce 10% by weight $CeO_2$ on solids. Analysis of the product showed the presence of the equivalent of 9.83% by weight $CeO_2$, 0.47% by weight $Nd_2O_3$ and 0.24% by weight $La_2O_3$. The product was tested as described in Example 1 and the polished disks had a strength (modulus of rupture) of 1482 MPa. The density of the disks was measured by mercury densometry and a mean value of 6.05 g/cm$^3$ was obtained.

EXAMPLE A (COMPARATIVE EXAMPLE)

A sample of zirconium oxide was coated in a manner similar to that described in Example 1 except that to the zirconia dispersion was added an aqueous solution of cerium sulphate (containing the equivalent of 40 grams per liter $CeO_2$) in an amount sufficient to introduce 8% by weight $CeO_2$ on solids. Analysis of the product showed the presence of 7.8% by weight $CeO_2$. The disks had insufficient strength (modulus of rupture) to be tested. The density of the disks was measured by mercury densometry and a mean value of 5.4 g/cm$^3$ was obtained.

It was clear that the addition of rare earth oxides, for example $Nd_2O_3$, $La_2O_3$, $Pr_2O_3$ is advantageous and the omission of such, it is believed, caused phase transformation from the tetragonal to the monoclinic to occur upon cooling to room temperature. This phase transformation sometimes induces cracks on account of the accompanied volume expansion.

EXAMPLE B (COMPARATIVE EXAMPLE)

A sample of zirconium oxide was coated in a manner similar to that described in Example 1 except that to the zirconia dispersion was added an aqueous solution of cerium sulphate (containing the equivalent of 40 grams per liter $CeO_2$) in an amount sufficient to introduce 12.25% by weight $CeO_2$ on solids. Analysis of the product showed the presence of the equivalent of 12% by weight $CeO_2$. The product was tested as described in Example 1 and the polished disks had a strength (modulus of rupture) of 1180 MPa. The density of the disks was measured by mercury densometry and a mean value of 5.99 g/cm$^3$ was obtained.

We claim:

1. A composition suitable for use in the manufacture of a ceramic material comprising particulate zirconia in which the particles are coated with a hydrous oxide of cerium and with at least one hydrous oxide selected from the group consisting of hydrous oxides of lanthanum, neodymium and praseodymium.

2. A composition according to claim 1 in which the majority of the particles have a diameter of less than or equal to 0.5 micron.

3. A composition according to claim 1 in which the majority of the particles have a diameter of less than 0.2 micron.

4. A composition according to claim 1 in which the hydrous oxide of cerium and the hydrous oxide selected from the group consisting of hydrous oxides of lanthanum, neodymium and praseodymium are present as a single layer comprising a mixture of oxides.

5. A composition according to claim 1 in which the particles are coated with an inner coating of a hydrous oxide selected from the group consisting of hydrous titania, hydrous zirconia, hydrous alumina and mixtures thereof.

6. A composition according to claim 1 in which the hydrous oxide of cerium is a hydrous Ce (IV) oxide.

7. A composition according to claim 1 in which the hydrous oxide of cerium is present in an amount of from about 2 to about 20 weight per cent expressed as $CeO_2$ based on weight of zirconia.

8. A composition according to claim 7 in which the hydrous oxide of lanthanum, neodymium or praseodymium is present in an amount of from about 0.05 to about 5.0 weight per cent expressed as $La_2O_3$, $Nd_2O_3$ or $Pr_2O_3$ based on weight of zirconia.

9. A composition according to claim 1 in which the particles are coated with a mixture of hydrous oxides of lanthanum and neodymium.

10. A composition according to claim 9 in which the hydrous oxide of cerium is present in an amount of from about 2 to about 12 weight per cent expressed as $CeO_2$ based on weight of zirconia and the mixture of hydrous oxides of lanthanum and neodymium is present in an amount of from about 0.05 to about 5.0 weight per cent expressed as $La_2O_3 + Nd_2O_3$ based on weight of zirconia.

11. A composition according to claim 9 in which the amount of hydrous oxide of cerium is from about 4 to about 10 weight per cent and the amount of the mixture of hydrous oxides of lanthanum and neodymium is from about 0.1 to about 3.0 weight per cent.

12. A composition according to claim 1 in which there is present an alkali metal impurity level not greater than 0.01% expressed as $M_2O$.

13. A composition according to claim 1 in which the zirconia particles are particles obtained by a vapour phase oxidation or hydrolysis of a zirconium compound.

* * * * *